United States Patent Office 3,758,384
Patented Sept. 11, 1973

---

3,758,384
PRECIPITATING AGENT SOLUTION FOR AMYLASE ASSAY
Arthur L. Babson and Susan R. Babson, Chester, N.J., assignors to Warner-Lambert Company, Morris Plains, N.J.
No Drawing. Continuation-in-part of application Ser. No. 205,294, Dec. 6, 1971. This application Apr. 5, 1972, Ser. No. 241,390
Int. Cl. G01n 31/14
U.S. Cl. 195—103.5 R        10 Claims

ABSTRACT OF THE DISCLOSURE

A stable, temperature-independent precipitating agent solution comprising an aqueous solution of zinc chloride and ethylene glycol monoalkyl ether, buffered to maintain an apparent pH of 5.6 to 6.7 with a benzoate buffer, is provided for use in an improved amylase assay. In the assay, a fluid test sample containing an unknown concentration of amylase is incubated with a water-soluble, dyed starch substrate for a specified period of time, after which the precipitating agent solution of this invention is added to remove all dyed starch which has not been hydrolyzed by the amylase, and the optical density of the remaining supernatant fluid is measured to indicate amylase concentration in the test sample.

CROSS REFERENCE TO RELATED APPLICATION

This application is a continuation-in-part of pending application U.S. Ser. No. 205,294, filed Dec. 6, 1971.

BACKGROUND OF THE INVENTION

The amylases are enzymes which catalyze the hydrolysis of starch. They may be of two types, $\alpha$-amylase or $\beta$-amylase, depending on the ability of the enzyme variety to hydrolyze certain linkages in the starch molecule. Starch itself is a polysaccharide comprising amylose fractions which have $\alpha$-1,4 linkages, and amylopectin fractions which have both $\alpha$-1,4 and $\alpha$-1,6 linkages. $\alpha$-Amylase can hydrolyze both the 1,4 and the 1,6 linkages of both amylose and amylopectin, while $\beta$-amylase is able to hydrolyze only the 1,4 linkage of the amylose fraction, leaving the 1,6 linkage of amylopectin unchanged.

The amylases of animal origin are of the $\alpha$-amylase type. Their presence has been shown in many tissues, but they are primarily produced by the pancreas and salivery glands. $\alpha$-Amylase is activated by the chloride ion and has been found to have optimum activity at a pH of about 7. The function of $\alpha$-amylase is to hydrolyze both the amylose and amylopectin fractions of starch in a random fashion, producing progressively smaller polysaccharide fragments which can be easily absorbed and assimulated in to the body system.

The determination of amylase activity in body fluids is becoming increasingly important. Elevated amylase levels in blood serum have been observed in a number of pathological conditions, but the most spectacular rise in serum amylase levels has been seen in acute pancreatitis where sudden increases to 30 or 40 times the normal level are not uncommon. In chronic pancreatitis, the increases are moderate and a substantial number of patients may actually have normal levels of amylase in their body fluids. Moderate elevations in serum amylase levels have also been seen in perforated peptic ulcer conditions and in intestinal obstruction disorders, wherein the increased amylase may be caused by leakage of the enzyme from the intestinal tract into the peritoneal cavity, followed by subsequent reabsorption from this cavity into the general circulation. Moderate elevations are also seen in mumps, renal insufficiency and cancer of the pancreas. Hepatobiliary disease is characterized by low levels of serum amylase.

Classical methods for the determination of amylase activity have been in use for a number of years. Recently, however, substantial improvements have been made in the reagents and methods used for the determination of amylase activity. For example, in U.S. Pat. No. 3,597,322, a method is disclosed wherein a water-soluble, dyed starch is incubated with the amylase containing test sample for a specified period of time, after which a temperature sensitive, alcoholic tannic acid precipitating agent is added to precipitate out all unhydrolyzed starch and protein, leaving a clear supernatant fluid upon which optical density measurements are taken. The alcoholic tannic acid solution must be at a temperature of from 20° C. to 30° C. before being added to the incubated test sample.

As a variation of the above procedure, there was described in Clin. Chem. 17: No. 4, pp. 311–315 (1971) by Sax, S.M., et al. a procedure whereby a dyed substrate, i.e., Procion Brilliant Red M–2BS–Amylopectin, is incubated with a sample of serum or urine for a specified period of time, after which all unhydrolyzed starch is removed by a two-step precipitation technique involving the addition, first, of ethylene glycol monomethyl ether, followed by the addition of a zinc sulfate solution; after the unhydrolyzed, dyed starch precipitant and protein are removed, optical density readings are taken on the remaining supernatant fluid.

While both of the above procedures are an improvement over previously used classical methods, it is readily apparent that there is still a need for an amylase assay utilizing a temperature independent, one-step precipitation procedure wherein a prepared, stable precipitating agent is provided.

SUMMARY OF THE INVENTION

In the determination of amylase activity in a fluid test sample, wherein the sample is incubated with a water-soluble, dyed starch substrate for a specified period of time, after which all unhydrolyzed dyed starch is precipitated out and optical density measurements of the remaining supernatant fluid indicates the concentration of amylase, there is provided a stable, temperature-independent precipitating agent comprising an aqueous solution of zinc chloride, an ethylene glycol monoalkyl ether, buffered to maintain an apparent pH of 5.6 to 6.7, preferably an apparent pH of 6.2 to 6.6, with a benzoate buffer. The preferred precipitating agent solution has an apparent pH of about 6.5 and contains, in distilled water, 0.10% by weight zinc chloride, 79.2% by weight ethylene glycol monoalkyl ether, 1.22% by weight benzoic acid and 0.24% by weight sodium hydroxide, based on the total weight of the precipitating agent solution.

DESCRIPTION OF THE INVENTION

The improved stable, temperature-independent precipitating agent solution of this invention, which can be used in the amylase assay procedure described in U.S. Pat. No. 3,597,322, is prepared by adding zinc chloride, ethylene glycol monoalkyl ether, benzoic acid, and an alkaline metal hydroxide to distilled water in the following concentrations:

TABLE I*.—PRECIPITATING AGENT SOLUTION

| Ingredients | Concentration, percent | Preferred concentration, percent |
|---|---|---|
| Zinc chloride | 0.05–0.20 | 0.08–0.15 |
| Ethylene glycol monoalkyl ether | 68–87 | 75–82 |
| Benzoic acid | 0.24–2.44 | 0.61–1.83 |
| Alkaline metal hydroxide | 0.08–0.30 | 0.16–0.27 |

*Concentrations are expressed as percent by weight, based on the total weight of the precipitating agent solution.

The ethylene glycol monoalkyl ether mentioned above may be either ethylene glycol monomethyl ether or ethylene glycol monoethyl ether, with the ethylene glycol monomethyl ether being preferred. Suitable alkaline metal hydroxides for the buffer ingredient include sodium hydroxide, potassium hydroxide and the like. Of these, sodium hydroxide is preferred. The choice of buffer ingredients, as well as the concentrations utilized, are significant features of the precipitating agent solution of this invention. For instance, a benzoate buffer has been found to be especially suitable for maintaining the required pH without adversely affecting the precipitating solution or the assay in which it is to be used. Buffers other than benzoate have been found to interfere with such characteristics as the solution stability or temperature independence of the precipitating solution. The accuracy of the amylase determination may also be greatly diminished when buffers other than benzoate are used in precipitating agent solutions of this invention.

The maintenance of a certain pH in the precipitating agent solution has also been found to be very important for the solution stability of the precipitating agent of this invention and its successful employment in the colorimetric determination of amylase. The nature of the ingredients in the precipitating agent solution preclude the determination of the actual pH of the solution by standard methods. However, it is possible by utilizing an instrument such as a Corning pH meter or a Beckmann pH meter (preferably with an expanded scale) to determine the "apparent" or "measured" pH of the precipitating agent solution. Thus, for the broad concentrations of ingredients in Table I above, the apparent pH is from about 5.6 to 6.7, and for the preferred concentrations of ingredients, the apparent pH is from about 6.2 to 6.6.

Of course, it is also possible to calculate the pH which would be maintained within the precipitating agent solution from the concentrations of buffer ingredients present. The broad concentrations of buffer ingredients listed in Table I above would maintain a calculated pH of from about 3.6 to 4.6, and the preferred concentrations of buffer ingredients would maintain a calculated pH of from about 4.0 to about 4.5.

In a most preferred embodiment of the invention, a precipitating agent solution having an apparent pH of 6.5 contains, in distilled water, 0.10% by weight zinc chloride, 79.2% by weight ethylene glycol monomethyl ether, and as the buffer, 1.22% by weight benzoic acid with 0.24% by weight sodium hydroxide, based on the total weight of the precipitating agent solution. The calculated pH maintained in this most preferred embodiment is about 4.4. The improved precipitating agent solution of the present invention described above is not sensitive to changes in temperature and can be used in the assay procedure of U.S. Pat. No. 3,597,322 with excellent results; all unhydrolyzed dyed starch remaining after incubation and any protein matter present in the fluid test sample will be removed completely at whatever temperature the precipitating agent is added. In the preferred procedure, the precipitating agent solution is added at room temperature, but it may be added at another temperature with no untoward effects on the sensitivity or accuracy of the amylase assay.

It is quite surprising that the zinc chloride/ethylene glycol monoalkyl ether combination of the instant invention, when buffered with a benzoate buffer to maintain pH within the specified range, will provide a stable, temperature-independent precipitating agent solution suitable for use in the colorimetric determination of amylase concentration. Considering the prior art precipitating agent combination described in Clin. Chem. 17: No. 4, 311–315 (1971), the zinc sulfate and ethylene glycol monomethyl ether must be added separately in a two-step precipitating procedure. If one attempts to combine the zinc sulfate ethylene glycol monomethyl ether prior to use in the amylase assay, an unstable mixture results which greatly diminishes the accuracy of the assay.

Thus, the unusual stability, both in solution and with respect to temperature changes, of the precipitating agent solution of this invention, coupled with the accurate, sensitive results obtained in amylase determinations in which this solution is used, makes this invention a great improvement over prior art products and procedures.

In order to further illustrate the present invention, the following examples are given:

EXAMPLE 1

Preparation of purified dyed amylopectin 40 grams of amylopectin (Amioca Starch 51–6002) are dissolved in 1000 ml. of distilled water and stirred. 100 ml. of a 10% aqueous solution of Geigy Reactone Red 2B are added, followed by 100 ml. of 2.5 N NaOH solution, and batch is stirred until it becomes too viscous for stirring. The batch is covered and allowed to stand at room temperature (23° to 26° C.) for about 18 to 24 hours (overnight). Add 1 N hydrochloric acid (about 250 ml.) with stirring to neutralize the reaction mixture (pH of 7) then dilute with distilled water to a volume of 1900 ml. and mix well. This reaction mixture is passed through a Sephadex G–25 column having a minimum height of 15 cm. and a void volume of 1100 ml., to remove all unreacted dye. Water is used as the equilibrating liquid. Fractions of the purified dyed starch are collected until the unreacted dye starts to elute. The eluant of the column is monitored for the presence of the alcohol soluble dye. About 1400 ml. of useful substrate can be obtained. The solution thus obtained is then buffered to maintain a pH of about 7 by the addition of an 0.1 M phosphate buffer. A sufficient amount of NaCl is added to yield 0.005 M NaCl in the final solution.

EXAMPLE 2

Preparation of precipitating agent solution 820 ml. of ethylene glycol monomethyl ether and 60 ml. of 1 N sodium hydroxide solution are added to 100 ml. of distilled water. 12.21 grams of benzoic acid is added, and the solution is stirred for 15 minutes. One gram of zinc chloride is added, with stirring for 15 minutes. The solution is brought to 1000 ml. with additional distilled water. The apparent pH of the final solution, as measured on a Beckmann Expandomatic pH meter, is 6.5.

EXAMPLE 3

Amylase assay using zinc chloride precipitating agent solution 0.2 ml. of a sample of blood serum is incubated with 1 ml. of the buffered soluble dyed substrate of Example 1 for 10 minutes at 37° C. At the end of this time, 5 ml. of the precipitating agent solution of Example 2 is added. The resulting precipitate is removed by centrifugation. The optical density of the remaining test supernatant fluid is read against a blank supernatant solution at a wave length of 540 nm. The amount of amylase present in the unknown sample is proportional to the absorbance of the supernatant fluid.

We claim:
1. A temperature-independent precipitating agent solution for use in the colorimetric determination of amylase concentration in a fluid sample is an aqueous solution having an apparent pH of from about 5.6 to about 6.7, comprising:
   (A) from about 0.05% to about 0.20% by weight, based on the total weight of the precipitating agent solution, of zinc chloride;
   (B) from about 68% to about 87% by weight, based on the total weight of the precipitating agent solution, of an ethylene glycol monoalkyl ether selected from the group consisting of ethylene glycol monomethyl ether and ethylene glycol monoethyl ether;
   (C) from about 0.24% to about 2.44% by weight, based on the total weight of the precipitating agent solution, of benzoic acid; and

(D) from about 0.08% to about 0.30% by weight, based on the total weight of the precipitating agent solution, of an alkaline metal hydroxide.

2. A precipitating agent solution according to claim 1 comprising an aqueous solution having an apparent pH of from about 6.2 to about 6.6 which contains:
  (A) from about 0.08% to about 0.15% by weight, based on the total weight of the precipitating agent solution, of zinc chloride;
  (B) from about 75% to about 82% by weight, based on the total weight of the precipitating agent solution, of an ethylene glycol monoalkyl ether selected from the group consisting of ethylene glycol monomethyl ether and ethylene glycol monoethyl ether;
  (C) from about 0.61% to about 1.83% by weight, based on the total weight of the precipitating agent solution, of benzoic acid; and
  (D) from about 0.16% to about 0.27% by weight, based on the total weight of the precipitating agent solution, of an alkaline metal hydroxide.

3. A precipitating agent solution according to claim 2 wherein the ethylene glycol monoalkyl ether is ethylene glycol monomethyl ether.

4. A precipitating agent solution according to claim 2 wherein the alkaline metal hydroxide is sodium hydroxide.

5. A precipitating agent solution according to claim 2 comprising an aqueous solution having an apparent pH of 6.5 which contains:
  (A) about 0.10% by weight, based on the total weight of the precipitating agent solution, of zinc chloride;
  (B) about 79.2% by weight, based on the total weight of the precipitating agent solution, of an ethylene glycol monomethyl ether;
  (C) about 1.22% by weight, based on the total weight of the precipitating agent solution, of benzoic acid; and
  (D) about 0.24% by weight, based on the total weight of the precipitating agent solution, of sodium hydroxide.

6. A method for the determination of amylase concentration in a fluid sample by
  (1) incubating the sample with a water-soluble, dyed starch substrate in the presence of chloride ion, said substrate being buffered to a pH of 6.5 to 7.8;
  (2) precipitating out all unhydrolyzed dyed substrate by the addition of a temperature-independent precipitating agent solution having an apparent pH of from about 5.6 to about 6.7 comprising an aqueous solution of:
    (A) from about 0.05% to about 0.20% by weight, based on the total weight of the precipitating agent solution, of zinc chloride;
    (B) from about 68% to about 87% by weight, based on the total weight of the precipitating agent solution, of an ethylene glycol monoalkyl ether selected from the group consisting of ethylene glycol monomethyl ether and ethylene glycol monoethyl ether;
    (C) from about 0.24% to about 2.44% by weight, based on the total weight of the precipitating agent solution, of benzoic acid; and
    (D) from about 0.08% to about 0.30% by weight, based on the total weight of the precipitating agent solution, of an alkaline metal hydroxide; and
  (3) reading the optical density of the remaining supernatant fluid.

7. A method according to claim 6 wherein the precipitating agent solution is an aqueous solution having an apparent pH of from about 6.2 to about 6.6 comprising:
  (A) from about 0.08% to about 0.15% by weight, based on the total weight of the precipitating agent solution, of zinc chloride;
  (B) from about 75% to about 82% by weight, based on the total weight of the precipitating agent solution, of an ethylene glycol monoalkyl ether selected from the group consisting of ethylene glycol monomethyl ether and ethylene glycol monoethyl ether;
  (C) from about 0.61% to about 1.83% by weight, based on the total weight of the precipitating agent solution, of benzoic acid; and
  (D) from about 0.16% to about 0.27% by weight, based on the total weight of the precipitating agent solution, of an alkaline metal hydroxide.

8. A method according to claim 7 wherein the ethylene glycol monoalkyl ether ingredient of the precipitating agent solution is ethylene glycol monomethyl ether.

9. A method according to claim 7 wherein the alkaline metal hydroxide of the precipitating agent solution is sodium hydroxide.

10. A method according to claim 7 wherein the precipitating agent is an aqueous solution having an apparent pH of 6.5 comprising:
  (A) about 0.10% by weight, based on the total weight of the precipitating agent solution, of zinc chloride;
  (B) about 79.2% by weight, based on the total weight of the precipitating agent solution, of an ethylene glycol monomethyl ether;
  (C) about 1.22% by weight, based on the total weight of the precipitating agent solution, of benzoic acid; and
  (D) about 0.24% by weight, based on the total weight of the precipitating agent solution, of sodium hydroxide.

References Cited

Babson et al.: "Clin. Chem.," 16(1): 39–43 (1970).

ALVIN E. TANENHOLTZ, Primary Examiner

M. D. HENSLEY, Assistant Examiner

U.S. Cl. X.R.

195—99